United States Patent [19]
Kim

[11] Patent Number: 5,573,224
[45] Date of Patent: Nov. 12, 1996

[54] WATER-SUPPLY VALVE OF A WASHING MACHINE

[75] Inventor: Jinsoo Kim, Incheon, Rep. of Korea

[73] Assignee: Daewoo Electronics Co., Ltd., Seoul, Rep. of Korea

[21] Appl. No.: 366,507

[22] Filed: Dec. 30, 1994

[30] Foreign Application Priority Data

May 31, 1994 [KR] Rep. of Korea ............... 94-12204

[51] Int. Cl.⁶ .................. F16K 31/04; F16K 31/385; F16K 31/40
[52] U.S. Cl. .................. 251/30.04; 251/45; 251/230; 251/252
[58] Field of Search ............... 251/30.02, 30.03, 251/30.04, 30.05, 45, 46, 129.15, 129.19, 129.2, 230, 252, 38; 137/387

[56] References Cited

U.S. PATENT DOCUMENTS

| | | | |
|---|---|---|---|
| 1,644,171 | 10/1927 | Caldwell | 251/230 |
| 1,765,377 | 6/1930 | Marks | 251/230 |
| 1,856,350 | 5/1932 | Metcalf | 251/230 |
| 1,885,846 | 11/1932 | Littlefield | 251/30.03 |
| 3,173,646 | 3/1965 | Wilcox | 251/129.2 |
| 3,593,957 | 7/1971 | Dolter et al. | 251/30.03 |
| 3,780,980 | 12/1973 | Kallel | 251/129.2 |
| 4,221,238 | 9/1980 | Madsen | 137/627.5 |
| 4,771,985 | 9/1988 | Gross et al. | 251/230 |

FOREIGN PATENT DOCUMENTS

| | | |
|---|---|---|
| 0012118 | 6/1980 | European Pat. Off. . |
| 0051517 | 5/1982 | European Pat. Off. . |

*Primary Examiner*—George L. Walton
*Attorney, Agent, or Firm*—Oliff & Berridge

[57] ABSTRACT

Disclosed is a water-supply valve of a washing machine in which the consumption of electric power can be minimized in opening and closing the valve to supply water into and block off the water supply from a washing tub of the washing machine. In the water-supply valve, an actuator rod is elevated against downward biasing force of a spring by a magnetic force of the solenoid generated by applying a voltage thereto, and then is retained at its uppermost position by the engagement between protuberances protruded from the inner wall of the actuator chamber and circumferential strips formed on the actuator rod.

8 Claims, 5 Drawing Sheets

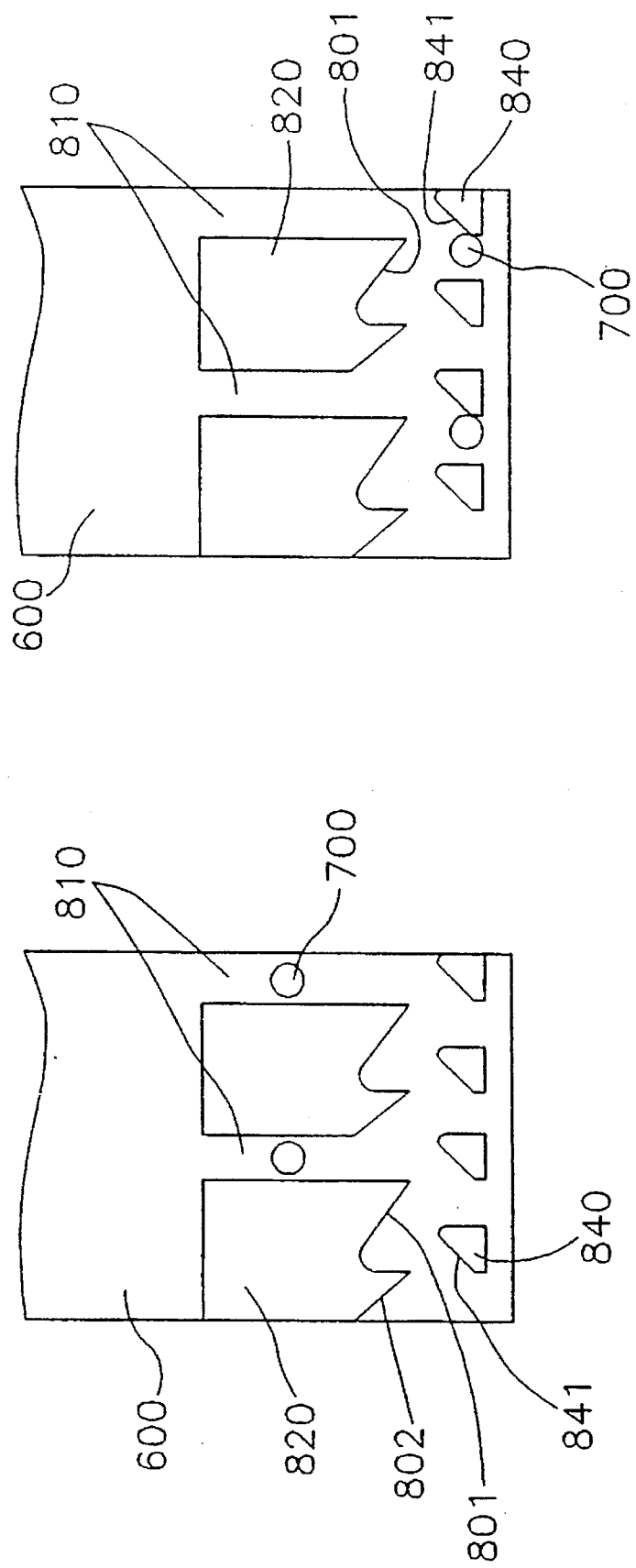

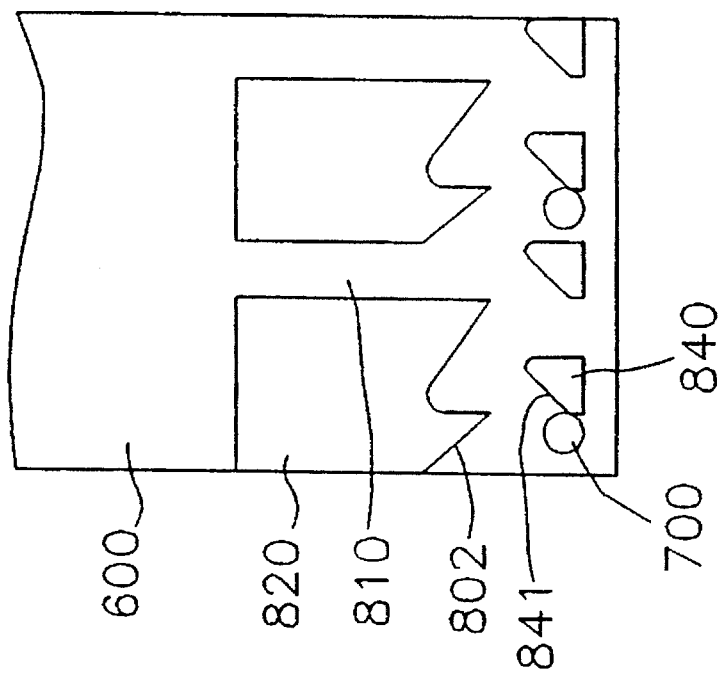
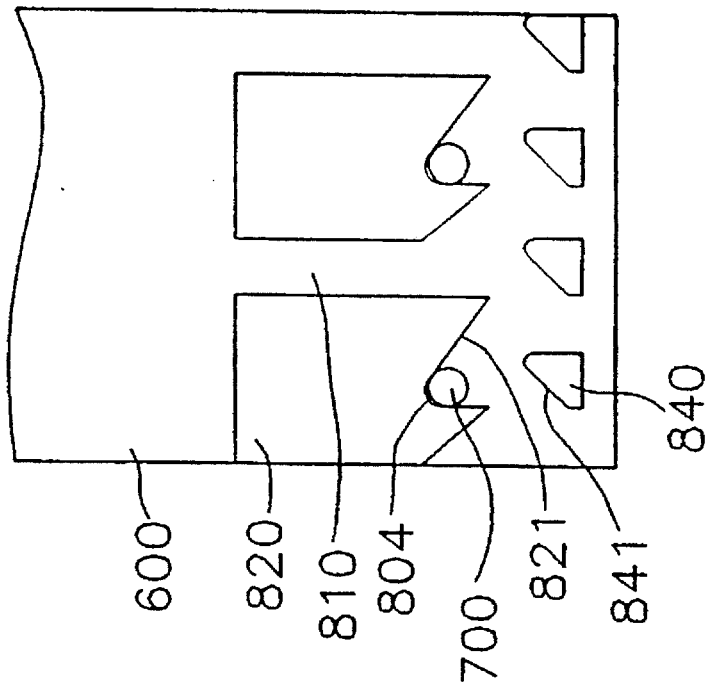

1

WATER-SUPPLY VALVE OF A WASHING MACHINE

BACKGROUND OF THE INVENTION

1. Field of the Invention

The present invention relates to a water-supply valve of a washing machine, and more particularly to a water-supply valve of a washing machine in which the consumption of electric power can be minimized in opening and closing the valve to supply water into and block off the water supply from a washing tub of the washing machine,

2. Description of the Prior Art

FIG. 5 shows a side sectional view of a general water-supply valve of a washing machine, which is opened or closed by operation of solenoids to cause water to be supplied into or blocked off from a washing tub of the washing machine therethrough.

Referring to FIG. 5, a water-introducing tube 11 for inducing water is connected to a valve body 10 of the water-supply valve, and a water-supply tube 12 for supplying water into the washing tub is vertically connected to valve body 10 near water-introducing tube 11. A reservoir 13 for interconnecting water-introducing tube 11 and a water-supply tube 12 is defined directly above water-supply tube 12.

A bellows 20 is disposed on the bottom surface of reservoir 13 and is in close contact with water-introducing tube 11 and a water-supply tube 12 to separate reservoir 13 therefrom. Bellows 20 has a water-inflow pore 21 formed at an outer portion thereof to interconnect water-introducing tube 11 and reservoir 13 in order for water to flow into reservoir 13 therethrough, and a water-exhaust port 22 at the center thereof to interconnect reservoir 13 and water-supply tube 12 in order for water having been retained in reservoir 13 to be supplied into the washing tub therethrough.

An actuator chamber 31 interconnected to reservoir 13 is defined above reservoir 13 by a cylindrical wall 10a of valve body 10. A solenoid 40 for generating magnetic force when electric power is supplied is disposed in cylindrical wall 10a.

An actuator rod 60 for opening/closing exhaust port is disposed in actuator chamber 31. Actuator rod 60 is elastically supported on the bottom of actuator chamber 31 by a spring 50.

In the above described conventional water-supply valve, when water is not supplied into the washing tub, water-exhaust port 22 is closed so that water is not supplied but retained in reservoir 13, and accordingly the pressure in reservoir 13 is maintained to be the same as that in water-introducing tube 11.

In order to supply water into the washing tub, a voltage is applied to solenoid 40 so as to generate a magnetic force by solenoid 40. Then, actuator rod 60 is moved upward in actuator chamber 31 while compressing spring 50, and accordingly the water having been retained in reservoir 13 is supplied into the washing tub through water-exhaust port 22. Therefore, the pressure in reservoir 13 becomes lower than that in water-introducing tube 11, so bellows 13 is elevated by the pressure of the water flowing into reservoir 13 from water-introducing tube 11. Then, water-introducing tube 11 is directly interconnected to water-supply tube 12, so that water flows directly from water-introducing tube 11 into water-supply tube 12 without passing through water-inflow port and water-exhaust port.

When the voltage having been applied to solenoid 40 is interrupted, actuator rod 60 is restored to its initial position by spring 50, so water-exhaust port 22 is closed again.

In the above described conventional water-supply valve, electric power supply to solenoid 40 must be continued while water is supplied into the washing tub, so the electric power consumption is too large. Further, fine wires of solenoid 40 can be broken or solenoid 40 can catch on fire due to heat generated by the continuous application of voltage to solenoid 40 during water supply.

SUMMARY OF THE INVENTION

The present invention is intended to overcome the above-discussed and numerous other disadvantages and deficiencies of the prior art.

Therefore, it is an object of the present invention to provide a water-supply valve of a washing machine, in which electric power need not be continuously supplied to the water-supply valve while water is supplied into a washing tub of the washing machine, so that the electric power consumption by the valve is greatly reduced, and a breaking of fine wires of solenoids and catching on fire of the solenoids due to heat generated by the continuous supply of power to the solenoids during water supply can be prevented.

To achieve the above object, the present invention provides a water-supply valve of a washing machine comprising:

a valve body including an actuator chamber defined in a middle part thereof, and a reservoir defined beneath the actuator chamber and interconnected to the actuator chamber;

a water-introducing tube interconnected to the reservoir to introduce water thereinto;

a water-supply tube having one end thereof interconnected to the reservoir and the water-introducing tube, and an other end thereof interconnected to a washing tub of the washing machine;

an actuator rod movable up and down in the actuator chamber and the reservoir, the actuator rod including circumferential strips attached on an outer periphery thereof, guide grooves extending vertically and defined between every two circumferential strips, and guide pieces respectively disposed below the circumferential strips and guide grooves;

protuberances protruding from an inner wall of the actuator chamber and guided along the circumferential strips, guide pieces, and the guide grooves;

a spring disposed on an upper bottom surface of the actuator chamber to force the actuator rod by the downward elastic biasing force thereof to apply a downward biasing force to the actuator rod;

a solenoid enclosing the actuator chamber in a cylindrical wall defining the actuator chamber, the solenoid generating a magnetic force by a voltage applied thereto to elevate the actuator rod against the downward biasing force of the second means; and a bellows disposed movably up and down in the reservoir according to ascent and descent of the actuator, the bellows having a water-inflow port, and a water-exhaust port, the water-inflow port interconnecting the water-introducing tube and the reservoir, and the water-exhaust port interconnecting the water-supply tube and the reservoir, respectively when the actuator rod is in close contact with the bellows to separate the reservoir from the water-introducing tube and the water-supply tube, the exhaust-port being blocked off by the actuator rod at its lowermost position, and when the actuator rod moves upward to interconnect the water-introducing tube and the water-supply tube, the water introduced into water-introducing tube pushing up the bellows.

wherein the protuberances are guided along the guide grooves, the serrated lower sides of the circumferential strips, and the upper sides of the guide pieces, and accordingly the water-supply tube is switched between opened and closed states, whenever the actuator rod is elevated to its uppermost position by only one time by the magnetic force generated by the solenoid.

Preferably, each of the circumferential strips has a horizontally extending upper side, a serrated lower side, and two vertically extending opposite lateral sides.

More preferably, each lower side of the circumferential strip has a first inclined section, a second inclined section, respectively inclined in same direction, a vertical connection section vertically extending between the first and the second inclined sections, and a round corner between the vertical connection section and the first inclined section, and each of the guide pieces has an upper side extending with an inclination inverse to those of the first and the second sections.

When a voltage is applied to the solenoid, magnetic force is generated by the solenoid, and the actuator rod moves upward by virtue of the magnetic force while pressing the spring, and accordingly the water-exhaust port is opened and the protuberances slide downward along the guide grooves and then along the upper inclined sides of the guide pieces.

Meanwhile, when electric power supply to the solenoid is ceased and thereby the magnetic force fades away, the actuator rod is returned downward again by the elastic biasing force of the spring. In this case, because the protuberances are located between the guide pieces, the protuberances move upward again while sliding along the first inclined sections, and then are engaged in the round corners so that the actuator rod is held at that position.

When water supply into the washing tub has been completed, electric power is supplied again to the solenoid, and the actuator rod moves upward again by the magnetic force of the solenoid.

According to the upward movement of the actuator rod, the protuberances slide along the inclined upper sides of the guide pieces. Then, electric power supply to the solenoid is ceased, and thereby the magnetic force fades away. Then, the actuator rod is returned downward again by the elastic biasing force of the spring. In this case, the protuberances move upward again and then slide upward along the second inclined sections of the circumferential strips and the guide grooves.

BRIEF DESCRIPTION OF THE DRAWINGS

The above objects and other advantages of the present invention will become more apparent by describing in detail a preferred embodiment thereof with reference to the attached drawings, in which:

FIGS. 4A through 4D are schematic constructional views showing the operation of an actuator rod in an actuator chamber of the water-supply valve of a washing machine as shown in FIG. 1.

DESCRIPTION OF THE PREFERRED EMBODIMENT

Hereinafter, a preferred embodiment of the present invention will be described in detail with reference to the accompanying drawings.

Figure 1:
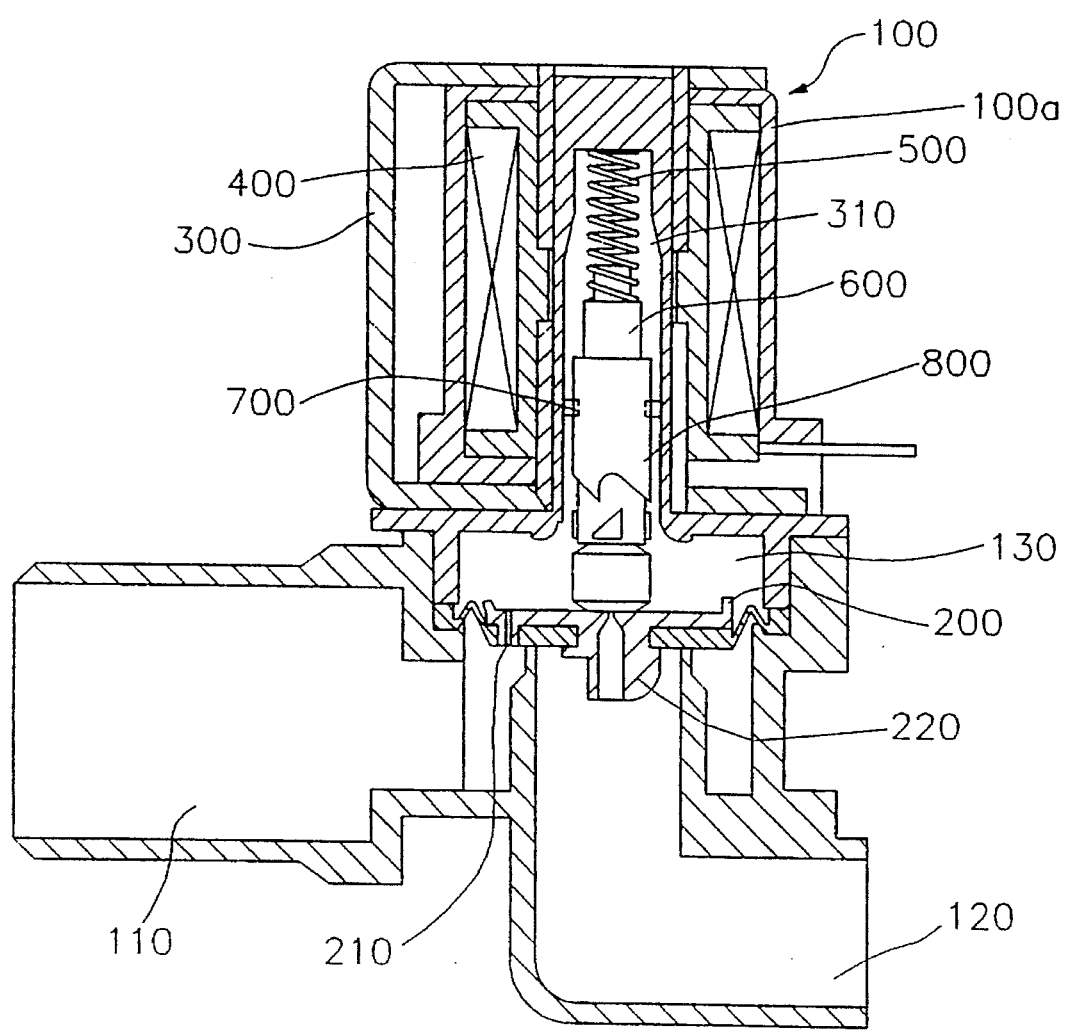
FIG. 1 is a side sectional view of a water-supply valve of a washing machine according to one embodiment of the present invention.

Referring to FIG. 1 showing a side sectional view of a water-supply valve of a washing machine according to an embodiment of the present invention, a water-introducing tube 110 for inducing water is connected to a valve body 100 of the water-supply valve, and a water-supply tube 120 for supplying water into the washing tub is vertically connected to valve body 100 near water-introducing tube 110. A reservoir 130 for interconnecting water-introducing tube 110 and a water-supply tube 120 is defined directly above water-supply tube 120.

A bellows 200 is disposed on the bottom surface of reservoir 130, and is in close contact with water-introducing tube 110 and a water-supply tube 120 to separate reservoir 130 therefrom. Bellows 200 has a water-inflow port 210 formed at an outer portion thereof to interconnect water-introducing tube 110 and reservoir 130 in order for water to flow into reservoir 130 therethrough, and a water-exhaust port 220 at the center thereof to interconnect reservoir 130 and water-supply tube 120 in order for water having been retained in reservoir 130 to be supplied into the washing tub therethrough.

An actuator chamber 310 interconnected to reservoir 130 is defined above reservoir 130 by a cylindrical wall 100a of valve body 100.

A solenoid 400 for generating magnetic force when electric power is supplied thereto is disposed in cylindrical wall 100a.

An actuator rod 600 for opening/closing water-exhaust port 220 according to the operation of solenoid 400 is disposed in actuator chamber 310. Actuator rod 600 is elastically supported on the bottom of actuator chamber 310 by a spring 500.

Figure 2:
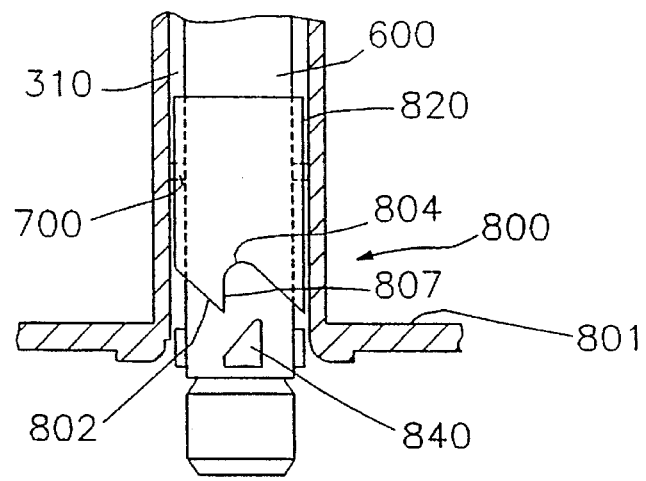
FIG. 2 is an enlarged exploded perspective view of an actuator chamber and an actuator rod disposed therein in the water-supply valve of a washing machine as shown in FIG. 1.
Figure 3:
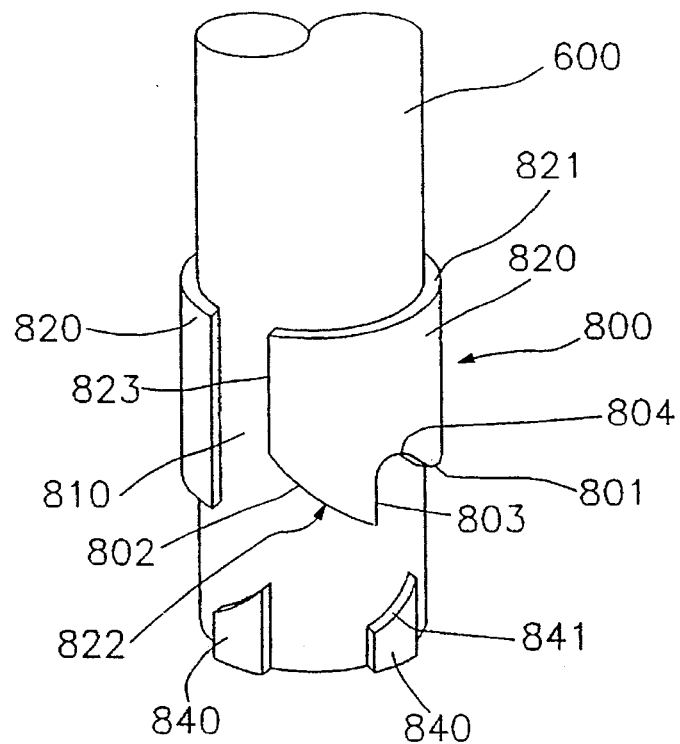
FIG. 3 is an enlarged perspective view of an actuator rod as shown in FIG. 1.
Figure 5:
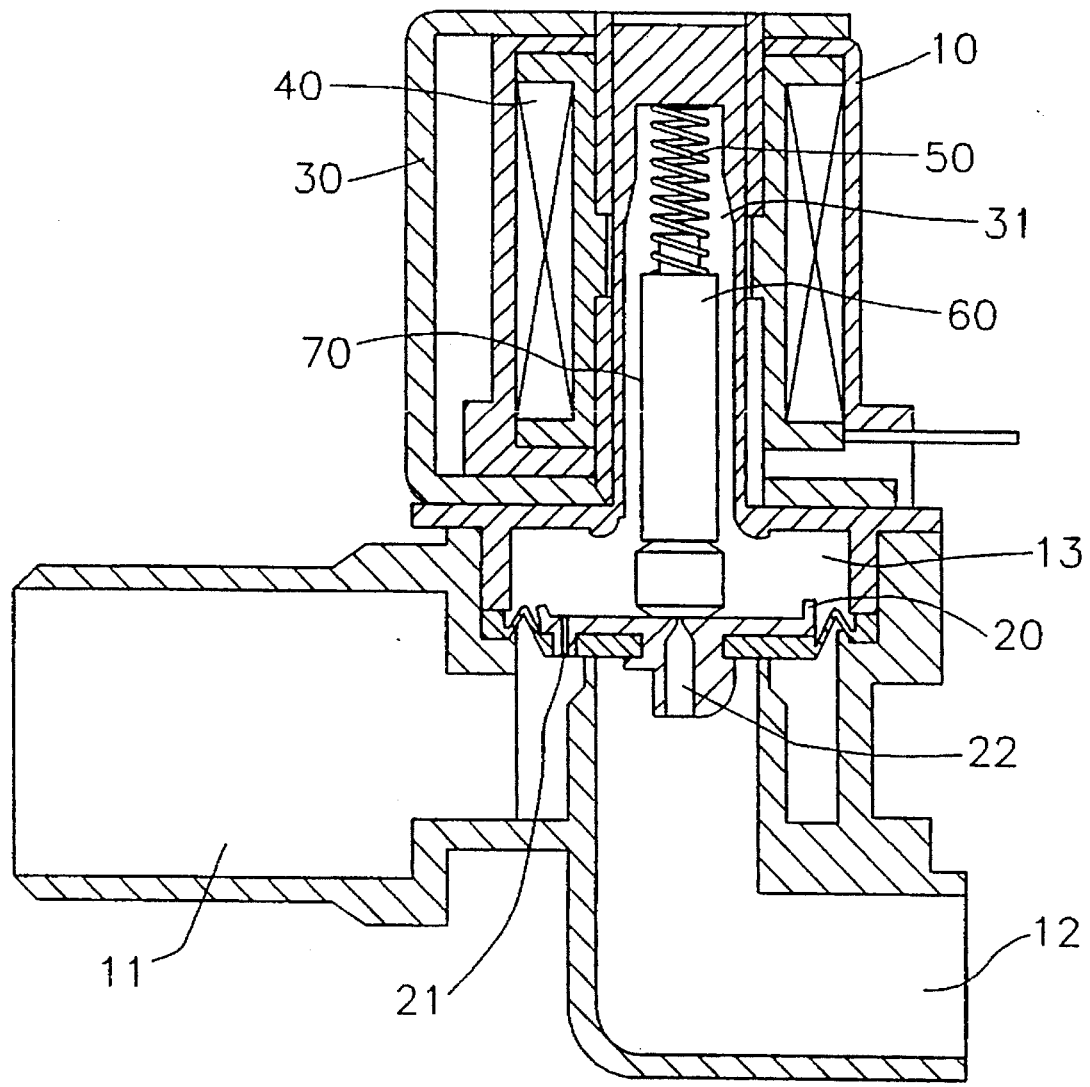
FIG. 5 is a side sectional view of a conventional water-supply valve of a washing machine.

Referring to FIGS. 2 and 3 showing actuator rod 600 more in detail, actuator rod 600 has a plurality of circumferential strips 820 provided on the outer peripheral surface thereof.

Each circumferential strip 820 has a horizontally extending upper side 821, a serrated lower side 822, and two vertically extending opposite lateral sides 823. Lower side 822 has a first inclined section 801, a second inclined section 802, respectively inclined in same direction, and a vertical connection section 803 vertically extending between first and second inclined sections 801 and 802. Each vertical connection section 803 is connected to each first inclined section 801 through a round corner 804. Vertically extending guide grooves 810 are formed one by one between every two circumferential strips 820.

Meanwhile, under guide grooves 810 and round corners 804 are formed a plurality of guide pieces 840 respectively corresponding thereto. Each guide piece 840 has an upper side 841 extending with an inclination inverse to those of first and second sections 801 and 802. That is, upper sides 841 of guide pieces 840 extend rightward and upward when first and second inclined sections 801 and 802 extend diagonally leftward and upward as shown in FIGS. 1 through 4D, and vice versa.

Further, a plurality of protuberances 700 respectively protruding into each guide groove 810 are formed on the inner wall of actuator chamber 310.

Meanwhile, a reference numeral 300 not described above designates a case surrounding cylindrical wall 100a to protect valve body 100.

Hereinafter, the operation of the water-supply valve having the above construction according to the present embodiment of the present invention will be described with reference to FIGS. 4A through 4D.

When actuator rod 600 is pushed downward by spring 500 so as to block off water-exhaust port 220, protuberances 700 are located in guide grooves 810 between circumferential strips 820 as shown in FIG. 4A, and water having been introduced into reservoir 130 through water-introducing tube 110 and water-inflow port 210 is not supplied into water-supply tube 120 through water-exhaust port 220 but retained in reservoir 130. In this case, the pressure in reservoir 130 is maintained to be the same as that in water-introducing tube 110.

When a voltage is applied to solenoid 400 automatically by a microcomputer or manually by handling a switch, magnetic force is generated by solenoid 400, and actuator rod 600 having been retained at its lowermost position by spring 500 moves upward by virtue of the magnetic force while pressing spring 500, and accordingly water-exhaust port 220 is opened, and protuberances 700 slide downward to come into contact with guide pieces 840 directly below guide grooves 840.

Actuator rod 600 continues moving upward while compressing spring 500, and thereby protuberances 700 slide along inclined upper sides 841 of guide pieces 840. In this case, actuator rod 600 rotates due to the sliding contact between protuberances 700 and guide pieces 840. When protuberances 700 are located between guide pieces 840 as shown in FIG. 4B, spring 500 is completely compressed so that actuator rod 600 no longer moves upward.

Meanwhile, when electric power supply to solenoid 400 is ceased and thereby the magnetic force fades away, actuator rod 600 having moved upward while compressing spring 500 is returned downward again by the elastic biasing force of spring 500. In this case, because protuberances 700 are located between guide pieces 840, protuberances 700 move upward again and then come into contact with first inclined sections 801 of circumferential strips 820.

Actuator rod 600 continues moving downward by the elastic force of spring 500, and thereby protuberances 700 slide along first inclined sections 801 so as to rotate actuator rod 600. When protuberances 700 are engaged in round corners 804 as shown in FIG. 4C, actuator rod 600 stops its rotation and downward movement but is held at that position. Accordingly, water-exhaust port 220 is maintained open, and water having been retained in reservoir 130 is supplied into water-supply tube 120 through water-exhaust port 220. In this case, the pressure in reservoir 130 decreases below that in water-introducing tube 110, so that water introduced into water-introducing tube 110 pushes up bellows 200, and thereby water-introducing tube 110 and water-supply tube 120 are directly interconnected with each other, and water is directly supplied from water-introducing tube 110 to water-supply tube 120 without passing through water-inflow port 210 and water-exhaust pore 220.

When water supply into the washing tub has been completed, electric power is supplied again to solenoid 400, and then a magnetic force is generated again by solenoid 400. Actuator rod 600 moves upward again by the magnetic force of solenoid 400 while pressing spring 500.

According to the upward movement of actuator rod 600, protuberances 700 move downward again to come into contact with the upper ends of inclined upper sides 841 of guide pieces 840 directly below round corners 804. Actuator rod 600 continues moving upward while compressing spring 500 again, and thereby protuberances 700 slide along inclined upper sides 841 of guide pieces 840 directly below round corners 804. In this case, actuator rod 600 rotates due to the sliding contact between protuberances 700 and guide pieces 840. When protuberances 700 are located between guide pieces 840 as shown in FIG. 4D, spring 500 is completely compressed so that actuator rod 600 no longer moves upward.

When the upward movement of actuator rod 600 is stopped as described above, electric power supply to solenoid 400 is ceased, and thereby the magnetic force fades away. Then, actuator rod 600 having moved upward while compressing spring 500 is returned downward again by the elastic biasing force of spring 500. In this case, protuberances 700 move upward again and then come into contact with second inclined sections 802 of circumferential strips 820.

Actuator rod 600 continues moving downward by the elastic force of spring 500, and protuberances 700 slide upward along second inclined sections 802 of circumferential strips 820, and then along guide groove 810. Actuator rod 600 blocks off water-exhaust port 220 and pushes bellows 200 downward while moving downward.

When bellows 200 is in close contact with the bottom of reservoir 130 and water-exhaust port 220 is completely blocked off by actuator rod 220 as shown in FIG. 1, protuberances 700 are located in guide grooves 810 as shown in FIG. 4A, and accordingly water supply into water-supply tube is interrupted.

As described above in detail, in a water-supply valve of a washing machine according to the present invention, electric power need not be continuously supplied to the water-supply valve while water is supplied into a washing tub of the washing machine, but opened or closed state of the valve is maintained only by an instantaneous power supply to the valve at a moment of supplying water or interrupting the water supply. Therefore, the electric power consumption by the valve is be greatly reduced, and the breaking of fine wires of solenoid 40 and catching on fire of solenoid 40 due to heat generated by the continuous supply of power to solenoid 40 during water supply can be prevented. Further, reliable water supply into the washing tub is guaranteed.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A water-supply valve of a washing machine comprising:

a valve body including an actuator chamber defined in middle part thereof, and a reservoir defined beneath the actuator chamber and interconnected to the actuator chamber;

a water-introducing tube interconnected to the reservoir to introduce water thereunto;

a water-supply tube having one end thereof interconnected to the reservoir and the water-introducing tube, and an other end thereof interconnected to a washing tub of the washing machine;

an actuator rod movable up and down in the actuator chamber and the reservoir, the actuator rod including circumferential strips attached on an outer periphery thereof, guide grooves extending vertically and defined between every two of the circumferential strips, and guide pieces respectively disposed below the circumferential strips and guide grooves;

protuberances protruding from an inner wall of the actuator chamber and selectively guided along different sections of the circumferential strips, guide pieces, and the guide grooves during movement of the actuator rode to different positions for selectively opening and closing the water-supply valve;

a first means for applying a downward biasing force to the actuator rod;

a second means for elevating the actuator rod against the downward biasing force; and a bellows disposed movably up and down in the reservoir according to ascent and descent of the actuator, the bellows having a water-inflow port, and a water-exhaust port, the water-inflow port interconnecting the water-introducing tube and the reservoir, and the water-exhaust port interconnecting the water-supply tube and the reservoir, respectively when the actuator rod is in close contact with the bellows to separate the reservoir from the water-introducing tube and the water-supply tube, the exhaust-port being blocked off by the actuator rod at its lowermost position, and when the actuator rod moves upward to interconnect the water-introducing tube and the water-supply tube, the water introduced into water-introducing tube pushing up the bellows, wherein the protuberances are guided along the guide grooves, the circumferential strips, and the guide pieces, and accordingly the water-supply tube is switched between opened and closed states, whenever the actuator rod is elevated to its uppermost position by only one time by the second means.

2. A water-supply valve of a washing machine as claimed in claim 1, wherein the first means includes a spring disposed on an upper bottom surface of the actuator chamber to force the actuator rod by the downward elastic biasing force thereof.

3. A water-supply valve of a washing machine as claimed in claim 1, wherein the second means includes a solenoid enclosing the actuator chamber in a cylindrical wall defining the actuator chamber, the solenoid generating a magnetic force by a voltage applied thereto to elevate the actuator rod against the downward biasing force of the first means.

4. A water-supply valve of a washing machine as claimed in claim 1, wherein each of the circumferential strips includes a horizontally extending upper side, a serrated lower side, and two vertically extending opposite lateral sides.

5. A water-supply valve of a washing machine as claimed in claim 4, wherein each said lower side of the circumferential strip includes a first inclined section, a second inclined section, respectively inclined in same direction, and a vertical connection section vertically extending between the first and the second inclined sections.

6. A water-supply valve of a washing machine as claimed in claim 5, wherein each said lower side of the circumferential strip includes a round corner between the vertical connection section and the first inclined section.

7. A water-supply valve of a washing machine as claimed in claim 1, wherein each of the guide pieces includes an upper side extending with an inclination inverse to those of the first and the second sections.

8. A water-supply valve of a washing machine comprising:

a valve body including an actuator chamber defined in a middle part thereof, and a reservoir defined beneath the actuator chamber and interconnected to the actuator chamber;

a water-introducing tube interconnected to the reservoir to introduce water thereunto;

a water-supply tube having one end thereof interconnected to the reservoir and the water-introducing tube, and an other end thereof interconnected to a washing tub of the washing machine;

an actuator rod movable up and down in the actuator chamber and the reservoir, the actuator rod including circumferential strips attached on an outer periphery thereof, guide grooves extending vertically and defined between every two of the circumferential strips, and guide pieces respectively disposed below the circumferential strips and guide grooves, each of the circumferential strips having a horizontally extending upper side, a serrated lower side, and two vertically extending opposite lateral sides, each said lower side of the circumferential strip having a first inclined section, a second inclined section, respectively inclined in same direction, a vertical connection section vertically extending between the first and the second inclined sections, and a round corner between the vertical connection section and the first inclined section, each of the guide pieces having an upper side extending with an inclination inverse to those of the first and the second sections;

protuberances protruding from an inner wall of the actuator chamber and selectively guided along different sections of the circumferential strips, guide pieces, and the guide grooves during movement of the actuator rod to different positions for selectively opening and closing the water-supply valve;

a spring disposed on an upper bottom surface of the actuator chamber to force the actuator rod by the downward elastic biasing force thereof to apply a downward biasing force to the actuator rod;

a solenoid enclosing the actuator chamber in a cylindrical wall defining the actuator chamber, the solenoid generating a magnetic force by a voltage applied thereto to elevate the actuator rod against the downward biasing force of the second means; and a bellows disposed movably up and down in the reservoir according to ascent and descent of the actuator, the bellows having a water-inflow port, and a water-exhaust port, the water-inflow port interconnecting the water-introducing tube and the reservoir, and the water-exhaust port interconnecting the water-supply tube and the reservoir, respectively when the actuator rod is in close contact with the bellows to separate the reservoir from the water-introducing tube and the water-supply tube, the exhaust-port being blocked off by the actuator rod at its lowermost position, and when the actuator rod moves upward to interconnect the water-introducing tube and the water-supply tube, the water introduced into water-introducing tube pushing up the bellows, wherein the protuberances are guided along the guide grooves, the serrated lower sides of the circumferential strips, and the upper sides of the guide pieces, and accordingly the water-supply tube is switched between opened and closed states, whenever the actuator rod is elevated to its uppermost position by only one time by the magnetic force generated by the solenoid.

* * * * *